United States Patent [19]

Doner

[11] Patent Number: 5,758,090

[45] Date of Patent: May 26, 1998

[54] FREQUENCY REUSE PLANNING FOR CDMA CELLULAR COMMUNICATION SYSTEM BY GROUPING OF AVAILABLE CARRIER FREQUENCIES AND POWER CONTROL BASED ON THE DISTANCE FROM BASE STATION

[75] Inventor: John R. Doner, Sebastian, Fla.

[73] Assignee: Airnet Communications, Inc., Melbourne, Fla.

[21] Appl. No.: 532,952

[22] Filed: Sep. 22, 1995

[51] Int. Cl.⁶ .................................................. G06F 13/00
[52] U.S. Cl. ........................... 395/200.66; 395/200.58; 370/335; 370/342; 370/431
[58] Field of Search .......................... 370/337, 702, 370/342, 335, 431; 455/33.1, 33.4; 375/335; 395/200.66, 200.58

[56] References Cited

U.S. PATENT DOCUMENTS

| | | | |
|---|---|---|---|
| 4,765,753 | 8/1988 | Schmidt | 370/332 |
| 5,212,830 | 5/1993 | Miller | 455/33.1 |
| 5,293,641 | 3/1994 | Kallin et al. | 455/33.1 |
| 5,299,228 | 3/1994 | Hall | 375/335 |
| 5,430,761 | 7/1995 | Bruckert et al. | 375/200 |
| 5,448,751 | 9/1995 | Takenaka et al. | 455/33.1 |
| 5,459,759 | 10/1995 | Schilling | 370/202 |
| 5,483,537 | 1/1996 | Dupuy | 370/95.3 |
| 5,544,171 | 8/1996 | Godecker | 370/337 |
| 5,551,060 | 8/1996 | Fujii et al. | 455/33.4 |
| 5,579,373 | 11/1996 | Jang | 455/436 |
| 5,581,548 | 12/1996 | Ugland et al. | 370/330 |
| 5,598,404 | 1/1997 | Hayashi et al. | 370/342 |

FOREIGN PATENT DOCUMENTS

| | | |
|---|---|---|
| 21047800 | 8/1993 | Canada . |

OTHER PUBLICATIONS

Ismail et al., "Forward-Link Frequency Reuse Efficiency of Power CDMA Cellular System", Sixth IEEE International Symposium on Personal, Indoor and Mobile Radio Communications (PIMRC '95), vol. 2, pp. 441–445.

Tonguz et al., "Cellular CDMA Network Impaired by Rayeigh Fading: System Performance with Power Control", IEEE Transactions on Vehicular Technology, vol. 43, Part 1, pp. 515–527, Aug. 1994.

Moher, "Spectral Reuse with Independent CDMA Systems in a Shadowed Environment", 1992 IEEE International Conference on Selected Topics in Wireless Communications, Conference Proceedings, pp. 211–214, 1992.

Gejji, "Forward-Link-Power Control in CDMA Cellular Systems", IEEE Transactions on Vehicular Technology, vol. 41, Issue 4, pp. 532–536, Nov. 1992.

*Primary Examiner*—Thomas C. Lee
*Assistant Examiner*—Ki S. Kim
*Attorney, Agent, or Firm*—Farkas & Manelli

[57] ABSTRACT

A radio frequency control technique for use in a wideband communications system, such as a Code Division Multiple Access (CDMA) system in which the use of several wideband forward channels is allocated in each cell depending upon the apparent location of the mobile station in the cell. In particular, a first set of forward channel frequencies is reserved for the mobiles located within a first certain radius of the base station antenna, and a second set of channels serve the area forming mobiles located in a concentric annular ring centered around the base station antenna. Third, fourth, and subsequent concentric rings may be used to provide successively longer radii from the base station to support the use of additional frequency sets in each cell.

4 Claims, 4 Drawing Sheets

FREQUENCY REUSE PLANNING FOR CDMA CELLULAR COMMUNICATION SYSTEM BY GROUPING OF AVAILABLE CARRIER FREQUENCIES AND POWER CONTROL BASED ON THE DISTANCE FROM BASE STATION

FIELD OF THE INVENTION

This invention relates to a method of operating a cellular mobile radio system and more specifically to a technique for increasing capacity through specific frequency reuse planning in a Code Division Multiple Access (CDMA) system or other systems using wide bandwidth modulation.

BACKGROUND OF THE INVENTION

The demand for wireless communication services, such as cellular mobile telephone (CMT), digital cellular network (DCN), personal communication services (PCS) and the like, requires the operators of such systems to make maximum effective use of the available radio frequency bandwidth. Consider that a system operator must serve an ever increasing number of users in a given geographic territory, while having been allocated only a certain amount of radio spectrum that affords the ability to transmit and receive on only a limited number of radio channels.

In a conventional cellular system, mobile station and base station communication links are created using narrow band radio channels. In an effort to make the best use of the allocated spectrum, the geographic territory is divided into a number of sub-areas, called cells. These narrowband radio channels are then allocated to the cells such that the amount of interference is minimal and such that capacity is maximized. This is typically accomplished by reusing the same channels within multiple cells located a minimum distance away from one another. This distance, called the reuse distance, is determined such that the interference between adjacent base stations is minimal.

Often, an extensive study is necessary to determine how to best reuse the channels, that is, how to best allocate respective radio frequencies, in order to maximize channel availability to each mobile station. Even with extensive frequency planning, however, service providers are finding that they cannot keep up with the demand for new cellular services, which in some areas has experienced annual growth rates of fifty percent (50%) or more. As such, numerous other techniques continue to be proposed to increase cellular mobile telephone system capacity.

One emerging class of wireless systems, known generally as broadband modulation systems, include systems using so-called Code Division Multiple Access (CDMA) modulation. In such systems, the radio link is established via a broadband radio channel. The broadband channel is then reused in much the same way as in conventional narrowband systems. However, an additional degree of reuse is provided in such systems by the fact that the radio carrier frequency is not only modulated with the information desired to be transmitted, but also by a high speed code sequence. By insuring that each communication at a given carrier frequency uses a mutually noninterfering, or so-called orthogonal code, a given radio channel frequency may in effect be reused multiple times in a given cell.

Although CDMA techniques permit many users to share what would otherwise be a single wideband radio frequency channel, in reality each mobile user does interfere somewhat with other users operating on the same radio channel. Thus, when there are many users of the same channel, even with CDMA modulation, a noise level may eventually be reached which precludes successful demodulation. Thus, there is an upper limit on how many users can successfully and simultaneously share the same wideband channel.

It is generally thought that a condition which maximizes the number of mobile stations which may be operated in any given cell is to ensure that the transmit power levels for the reverse (mobile-to-base) channel be set such that nearly equal receive signal strength level is measured at the base from all mobile stations.

This condition overlooks the fact, however, that the base station must also transmit in the forward direction (base-to-mobile). Mobile stations are generally located at various distances from the base station, and the nature of a cellular system is such that these distances change over time, as the mobile units move about within a cell. Receive power level can generally be predicted to vary as the inverse of the fourth power of the distance D, between the mobile station and the base station. Thus, a mobile located at a distance D requires 1/16th of the signal power needed to complete the radio link for a mobile located at a distance 2D. As a result, the mobile stations located near the base station tend to receive not only the desired forward signal, but also many forward signals from other mobiles on the same channel. These signals may be at much higher power levels than the desired forward signal channel.

To some extent, this interference can be compensated for by increasing the forward signal level. Indeed, such power level control is a feature of most cellular systems with power level being varied, as a function of the inverse of the distance between the mobile and the base. However, increasing the base station transmit power in this manner, of course, also increases the interference level to all mobiles located within the cell. As a result, the capacity limit, that is the maximum number of subscribers per channel which can be supported in each cell, is actually adversely affected if conventional power level control techniques are applied to broadband modulation systems.

DESCRIPTION OF THE INVENTION

Objects of the Invention

It is an object of this invention to maximize the frequency reuse factor in a broadband wireless communication system, such as one using Code Division Multiple Access (CDMA) techniques, without adversely affecting the number of mobile stations which may be active in a cell.

Another object is to reduce the self-interference effect in such systems.

A still further object is to provide a way to increase the signal power for specific base to mobile radio links without adversely affecting other active radio links in the cell.

Yet another object is to reduce the total radiated radio frequency power required to operate a given number of mobile stations in a cell.

Summary of the Invention

Briefly, the invention is a radio frequency control technique for use in a broadband communications system, such as a Code Division Multiple Access (CDMA) system, in which the use of several wideband forward channels is allocated in a cell depending upon the apparent location of the mobile stations in the cell so that each mobile station is active on a channel frequency at which all other mobile stations are operating at approximately the same power level.

In particular, a first set of forward channels is reserved by the base station for transmitting to the mobile stations located within a first certain radius of the base station antenna at a predetermined power level. A second set of forward channels service the mobile stations located in a concentric annular ring centered around the base station antenna at a second power level. Third, fourth, and subsequent sets of forward radio channels may then be used to service mobile stations located at successively longer radii and successively different power levels.

Because the signals intended for other mobiles received at each target mobile station are thus of approximately equal signal power, regardless of the distance of the mobile station from the base station, this in turn increases the level at which interference from other mobile stations in the same cell can be tolerated.

As a result, a greater number of mobile stations can be supported in a given cell.

At the same time, a significant reduction in the amount of radio frequency power needed to support communications in a cell is also provided.

BRIEF DESCRIPTION OF THE DRAWINGS

For a more complete understanding of the invention and its novel advantages and features, please refer to the accompanying drawings in which.

DETAILED DESCRIPTION OF A PREFERRED EMBODIMENT

Figure 1:
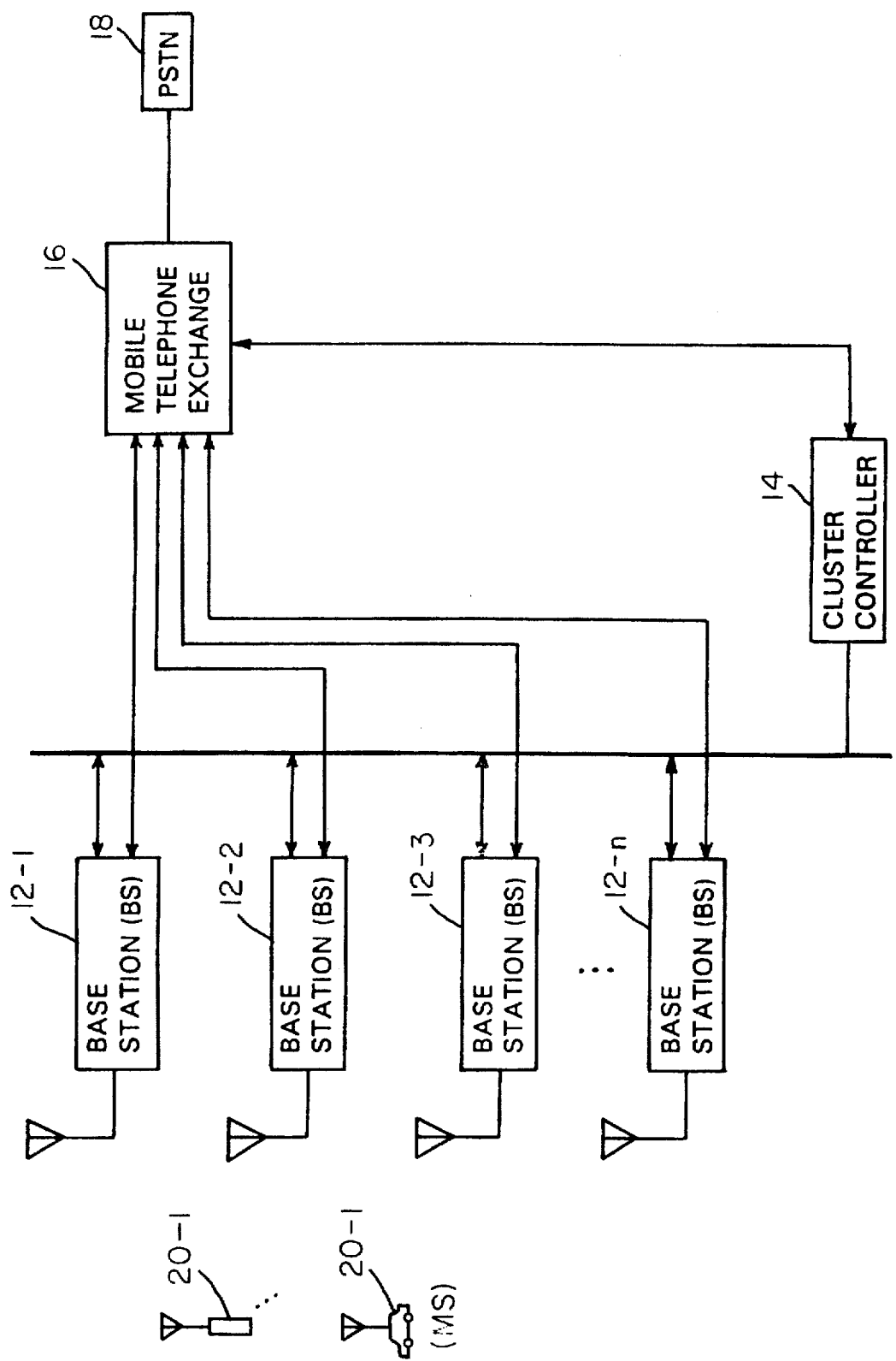
FIG. 1 is a block diagram of a broadband wireless communication system in which the invention may be used.

Before proceeding with a description of the frequency assignment scheme according to the invention, it will be helpful to review the operation of certain components of a typical wireless communication system. Turning attention to the drawings, FIG. 1 illustrates a wireless communication system 10 in which the invention may be advantageously employed. The system 10 includes a plurality of antenna sites having base stations 12, with each base station 12 typically being associated with a sub-area, or cell, of the geographic area assigned to the service provider.

A number of base stations 12-1, 12-2, ... 12-n, are arranged in a group called a cluster. A cluster controller 14 and mobile telephone exchange 16 provide connections between the base stations 12 in the cluster and a public switched telephone network 18 through a mobile telephone exchange 16. The system 10 thus permits mobile stations 20-1, ... 20-p to communicate with each other or with other devices that may be connected to the telephone network 18. The cluster controller 14 is responsible for coordinating these connections by controlling the operation of the base station 12 and the exchange 16 to set up the appropriate interconnections between the subscribers of the landline telephone network 18 and the mobile stations 20, in a manner which is well known. It should be understood however, that it may be possible to use the invention in other wireless telephone network environments.

Figure 2:
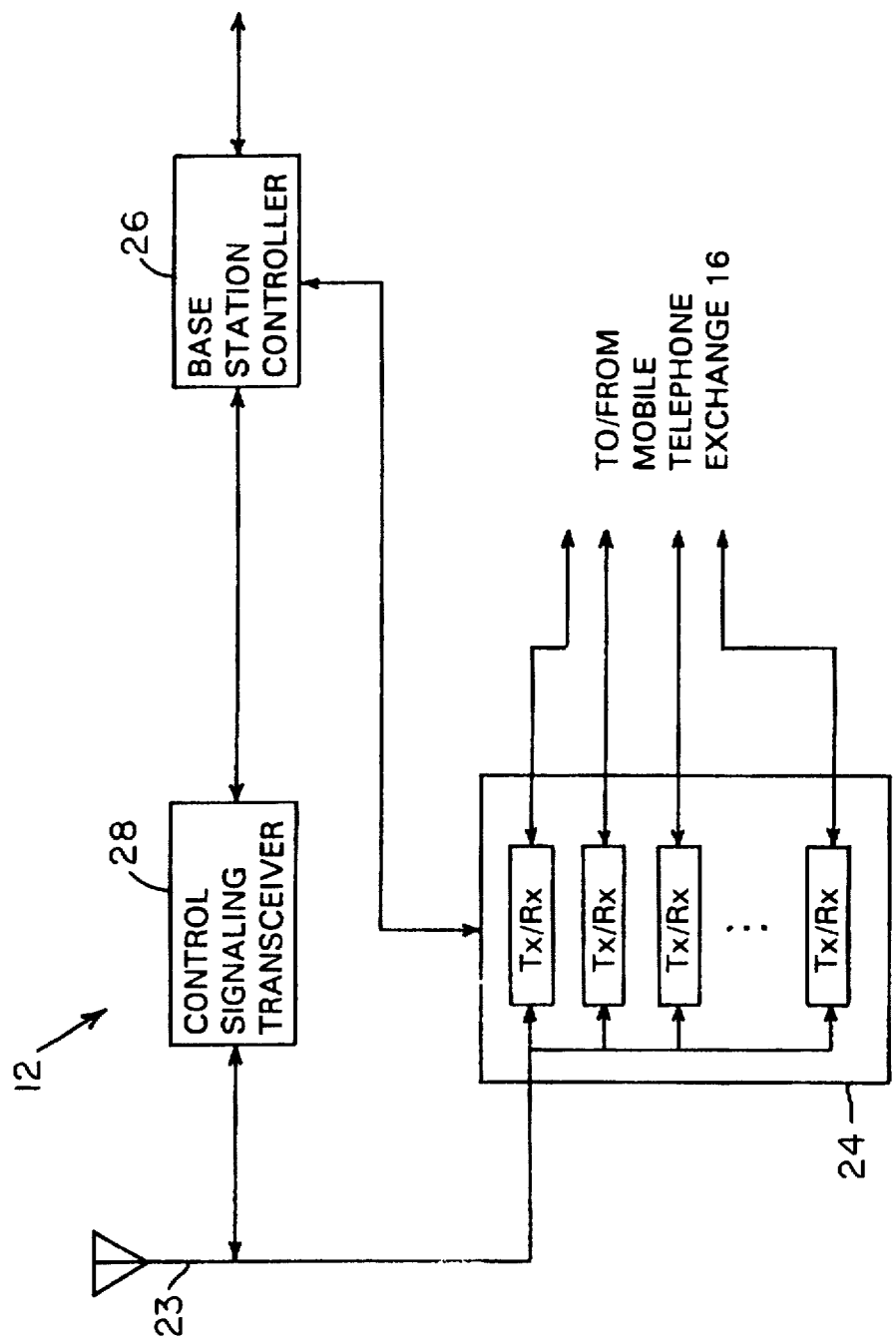
FIG. 2 is a block diagram of a base station and base station controller portion of the system in which the invention may be implemented.

FIG. 2 is a more detailed block diagram of one of the base stations 12. As shown, the base station 12 includes at least one antenna 23 to support radio communication with the mobile stations 20 located within the cell being serviced by that particular base station 12. The radio communication is by a broadband modulation scheme, such as Code Division Multiple Access (CDMA), which permits multiple mobile stations 20 to share the same communication channel.

The antenna 23 is in turn connected to a bank of transceivers 24. The transceivers 24 operate, in conjunction with the base station controller 26, to provide required filtering, modulation, and demodulation functions so that the radio signals received and provided to the mobile stations 20 may be individually isolated and connected to the telephone network 18. The components of each base station 12, including at least the antenna 23 and transceivers 24, are typically located substantially in the center of the respective one of the cells of the cellular communication system 10.

In addition, the antenna 23 is connected to a control signaling receiver 28 to permit transmission and reception of control signals between the base station controller 26 and the mobile stations 20. Such control signals are required in any conventional cellular system in order to set up a connection with the telephone network 18. For example, when a mobile station 20 first requests service, it issues a control signal which is received by the antenna 23 and control signaling transceiver 28 and then forwarded to the base station controller 26. The base station controller 26 then determines a frequency assignment for the newly active mobile station 20 and arranges for one of the transceivers 24 to handle the voice or data communications between the base station 12 and mobile station 20.

Figure 3:
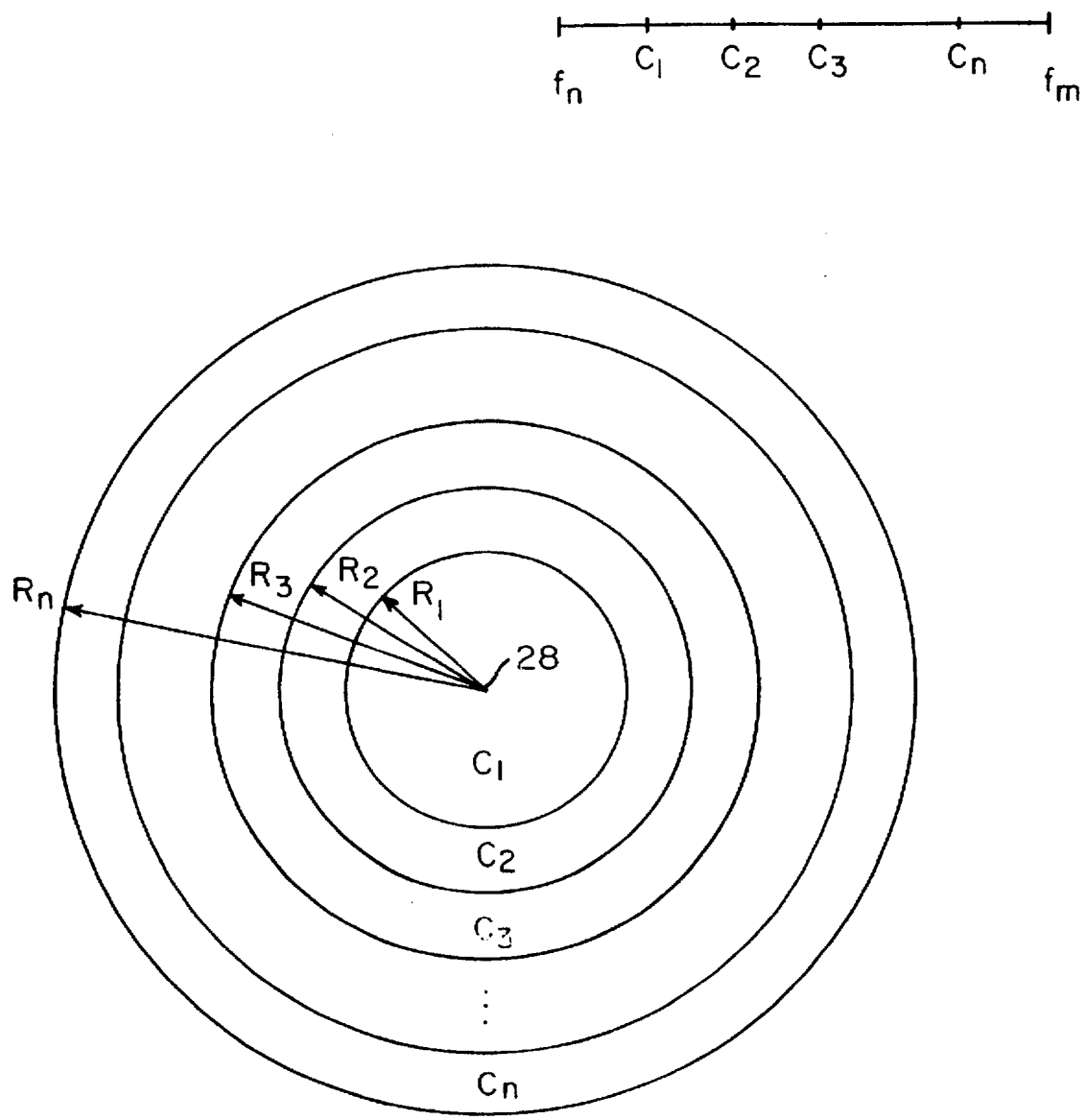
FIG. 3 is an illustration of a frequency assignment scheme according to the invention whereby available radio channel frequencies are divided into groups and then the groups are assigned to mobile stations depending upon the location of the mobile stations within the cell.

FIG. 3 is a diagram of an exemplary cell serviced by the base station 12. In accordance with the invention, frequency assignments are made to the forward (base station to mobile station) links by the base station controller 26 based upon the apparent location of the mobile station 20 within the cell. In particular, one or more wideband forward channels are reserved for mobile stations 20 located within a certain radius of the base station antenna 28, and other channels, or groups of forward channels, are reserved for mobile stations 20 located in concentric rings centered around the base station antenna 28.

In other words, suppose that m available radio frequencies, $f_1, f_2, \ldots f_m$, are divided into n groups, $c_1, c_2, \ldots, c_n$. The first group of frequencies, $c_1$, are used by the base station controller 20 to establish forward links with mobile stations located within a first radius, $R_1$, of the base station antenna 23. The second group of frequencies, $c_2$, are assigned for use by mobile station 20 located within an annular ring between radiis $R_1$ and $R_2$. Likewise, the nth frequency group, $c_n$, is assigned for use by mobile stations located between radii $R_{n-1}$ and $R_n$.

It is apparent, then, that the base station 12 controller 20 must determine a radial distance to the mobile station prior to assignment of a forward channel frequency. In the preferred embodiment this is done by determining a signal strength received by the mobile station 20, such as by detecting a receive signal strength indication (RSSI) level during the control signal exchange with the control signaling receiver 28. Alternatively, this may be done by measuring the receive signal level at a transceiver 24 which is initially allocated to serving the mobile station 20.

As a result of assigning base station coverage area in this manner, a receiver mobile station 20 is thus active on a forward channel radio frequency at which all other mobile station signals are operating at approximately the same transmit power level.

This approach provides an optimal situation in Code Division Multiple Access (CDMA) or other broadband modulation systems, in the sense that potentially interfering signals received at a given mobile station 20 from other mobiles operating at the same carrier frequency are of approximately equal power. The well-known cross correlation property of CDMA demodulation, as used in the mobile station 20 receivers, thus behaves in a more predictable and controlled fashion, since all interfering signal powers are at approximately the same level.

The radii $R_1, R_2, \ldots, R_n$ may be adjusted to optimize the power consumption. For example, given n, the number of rings in the cell, the radii $R_1, R_2, \ldots, R_n$, may be set to be proportional to $$R_k = \sqrt{k/n}, \text{ for } k = 1, 2, \ldots, n,$$

In such a scenario, the total power needed to service m mobile stations in the cell will then be given by $$P_{total} = \frac{m}{n} \left( \sum_{k=1}^{n} \frac{k^2}{n^2} \right) P_o,$$

assuming $m \geq 0$, and where $P_o$ is the power needed to close a link to the cell periphery, $R_n$.

Using this approach optimizes the total power needed by a base station. For example, in the case where the number of rings, n, is 2, the total base station power can be shown to be reduced by a factor of 0.625. Where n is equal to 3, the total power needed by the base station is reduced by a factor of 0.52.

Figure 4:
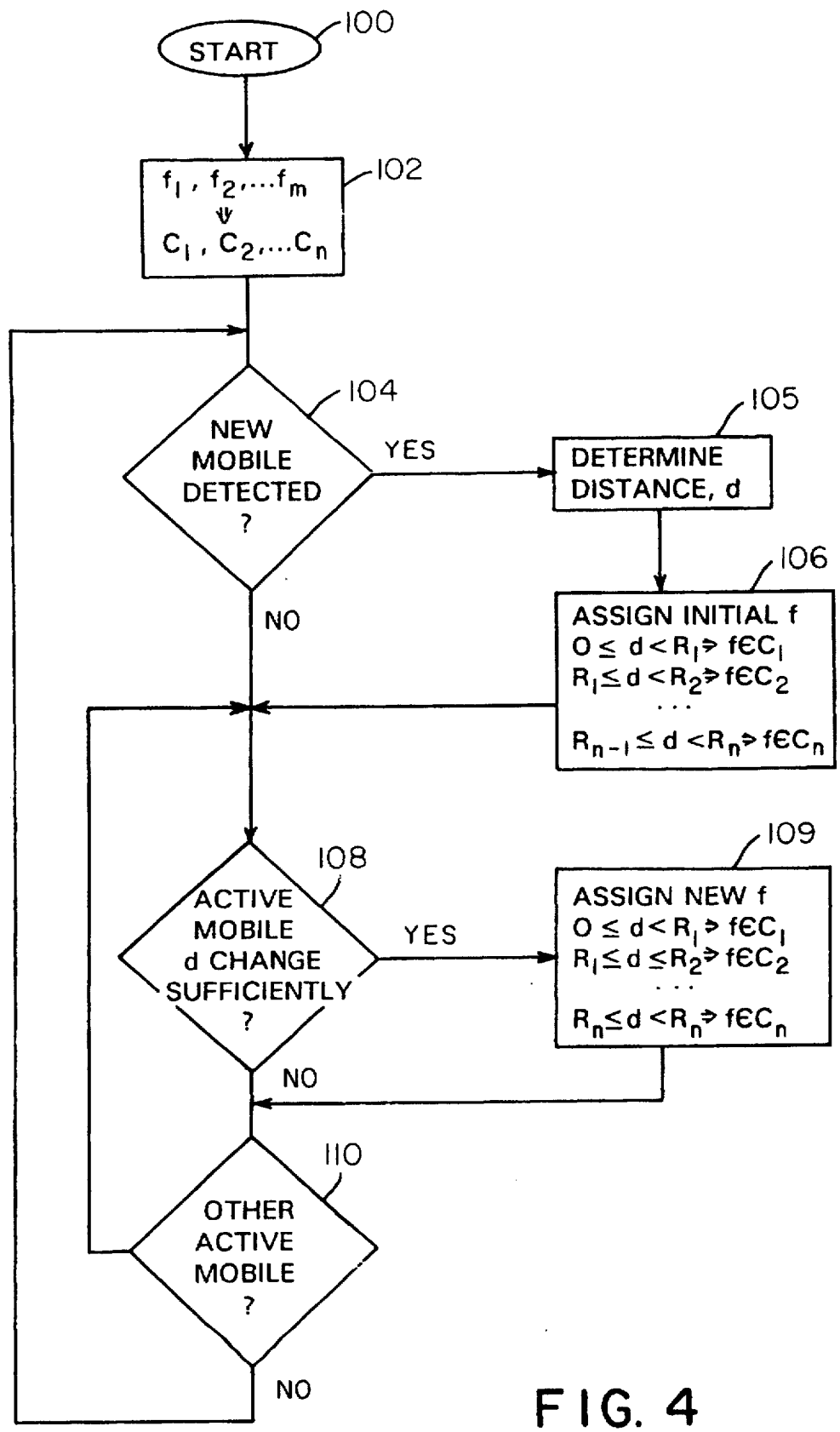
FIG. 4 is a flowchart of the procedure used by a base station controller to assign frequencies to mobile units in accordance with the invention.

FIG. 4. is a flowchart of the operations performed by the base station controller 26 when assigning channel frequencies according to the invention.

Step 100 is an initial starting state. From there, control progresses to a step 102, where the available frequencies $f_1, f_2, \ldots, f_m$ are associated with n frequency groups, $c_1, c_2, \ldots, c_n$. These n frequency groups are then assigned, one frequency group per ring, to the mobile stations operating in the cell such as by storing the list of frequencies for each group in a memory in the base station controller 26.

Control then passes to step 104 when the presence of a new mobile station within the cell is detected.

If there are no new mobile stations, then control passes to step 108.

However, if a new mobile station is detected, then control passes to step 105. In step 105 the distance, d, between the mobile station and the base station antenna is determined. Knowing this distance, d, control then proceeds to step 106 in which an initial operating frequency is assigned to the forward link for servicing the new mobile station. For example, if d is between 0 and a first radius, $R_1$, then the frequency is selected from the set $c_1$. Likewise, if d is between radius $R_1$ and a second radius $R_2$, then the frequency is selected from a second set $c_2$. Greater distances are similarly processed, up to distance d being between radius $R_{n-1}$ and $R_n$, in which instance the frequency is selected from the set $c_n$.

After selecting the initial forward link frequency for the new mobile station, then control passes to step 108.

In step 108, the base station controller 26 determines if the distance d, for a previously active mobile station has changed. If that distance has changed sufficiently, such that the mobile station has entered a different one of the n rings, then control passes to a step 109 where a new frequency is assigned. The frequency assignment scheme in step 109 is the same as that in step 106. In other words, the frequency for the forward link is selected from one of the sets $c_1, c_2, \ldots, c_n$ based upon the distance d as explained above.

Control then returns to step 110 where it is determined if there are other active mobile stations in the cell. If so, then control returns to step 108 which is then iteratively executed for each of the active mobiles in the cell.

Once each of the active mobiles are checked in this way, then control eventually returns to step 104, where the presence of new mobiles is again checked for.

What is claimed is:

1. A broadband cellular communication system consisting of a plurality of cells, the plurality of cells being located substantially adjacent to one another, with each cell containing an antenna centrally located within-the cell, and the system for supporting radio communication using forward radio links between a base station connected to the antenna and a plurality of mobile stations located in the cell using a plurality of radio carrier frequencies, the forward radio communication links between the base station and the mobile stations being of the broadband encoded type such that multiple mobile stations may share a radio carrier frequency without interfering with one another, the system comprising:

means for grouping available radio carrier frequencies into a number, n, of groups, with the assignment of frequencies to groups being exclusive such that any one available frequency is only assigned to one group and such that a frequency may be assignable to more than one mobile station;

means for determining a radial distance, d, between the base station antenna and a particular mobile station within a cell;

means for determining from the radial distance, d, which of a plurality, n, of concentric rings positioned about the base station antenna that the particular mobile station is located in; and means for assigning a radio carrier frequency to the forward link for servicing the particular mobile station based upon which of the n concentric rings that the particular mobile station was located in, such that interfering signals received by the particular mobile station from other forward radio links in the cell at the same carrier frequency are of approximately the same power level.

2. A system as in claim 1 additionally comprising:

means for setting a transmit power level for the particular mobile station depending upon which of the n concentric rings in which the particular mobile station is located.

3. A system as in claim 1 wherein the means for assigning a carrier frequency additionally comprises:

means for assigning carrier frequencies such that each forward radio link to each mobile station on a particular carrier frequency uses approximately the same transmit power level as other forward radio links to other mobile stations transmitting on that particular carrier frequency located in the same concentric ring.

4. A system as in claim 1 wherein the n concentric rings are located between a set of n radii, $R_1, R_2, \ldots, R_n$ such that $R_k = \sqrt{k/n}$, for $k = 1, 2, \ldots, n$.

* * * * *